W. W. McRAE.
RIM FOR THE WHEELS OF MOTOR CARS AND OTHER VEHICLES.
APPLICATION FILED DEC. 12, 1918.
1,420,329. Patented June 20, 1922.
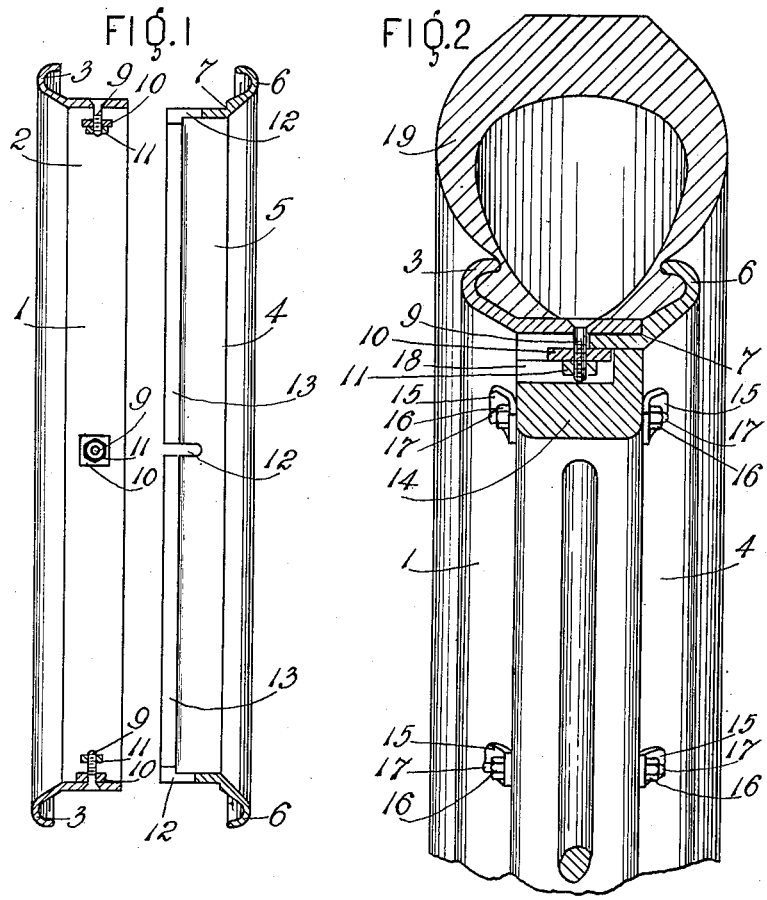
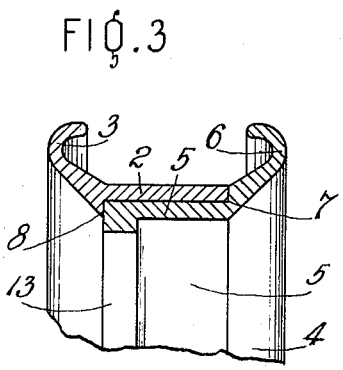
INVENTOR:
William Wilsden McRae
By Wm Wallace White
ATTY.

UNITED STATES PATENT OFFICE.

WILLIAM WILSDEN McRAE, OF WAITUNA, WAIKARI, NEW ZEALAND.

RIM FOR THE WHEELS OF MOTOR CARS AND OTHER VEHICLES.

1,420,329.  Specification of Letters Patent.  Patented June 20, 1922.

Application filed December 12, 1918. Serial No. 266,383.

*To all whom it may concern:*

Be it known that I, WILLIAM WILSDEN McRAE, a subject of the King of Great Britain, residing at "Waituna," Waikari, in the Province of Canterbury, Dominion of New Zealand, have invented new and useful Improvements in and Relating to Rims for the Wheels of Motor Cars and Other Vehicles, of which the following is a specification.

This invention relates to the tyre carrying rims of the wheels of motor-cars and the like, its object being to provide a novel construction of divisible rim whereby the operations of mounting and dismounting of the tyres will be facilitated and the possibility of pinching or damaging the tube during such operations precluded, while a further object of the invention being to provide a construction which when assembled, will effectively exclude grit and other undesirable matter from the interior of the tyre.

In carrying this object into effect, the present construction comprises a pair of rim members, each consisting of a peripheral or web-portion, and each provided around one of its lateral sides with the usual bead adapted to receive one bead of the tyre, the arrangement being such that the web-portion of one of said members is adapted to fit telescopically within the web-portion of the other said member.

In order that the nature of the invention and its construction may be clearly understood, reference will now be made to the accompanying sheet of drawings, in which:—

Fig. 1— shows in diametrical cross-section, the two members of the rim apart,

Fig. 2— is also a diametrical cross section, on a somewhat larger scale, showing a portion of a wheel with the rim and tyre mounted thereon, and Fig. 3— is a similar view of a portion of the rim assembled and illustrating by way of example, a slight modification of the construction.

The said construction comprises a rim-member 1 consisting of a web-portion 2 terminating at one of its lateral sides in a bead 3 and a second rim-member 4, consisting of a web-portion 5 of relatively smaller diameter, adapted to fit telescopically within the aforesaid web-member 2 and similarly provided at one of its lateral sides with a bead 6.

Limiting means are provided to determine the depth to which the web-portion 5 is so inserted within the web-portion 2 in order to prevent jamming or straining of the said members.

As here shown in Figs. 1 and 2, this purpose is effected by providing around the outer periphery of the web-portion 5, a shoulder 7 with which the plain or unbeaded side of the web-portion 2 is adapted to abut. The same purpose may, however, be effected as shown in Fig. 3 by providing, either in lieu of or in addition to the shoulder 7, a shoulder 8 formed around the inner periphery of the web-portion 2 adapted to abut with the unbeaded side of the web-portion 5.

Means are provided for locking the rim-members 1 and 4 together. As here shown, this purpose is effected by providing the web-portion 2 with a plurality of radially disposed studs or bolts 9 which project inwardly and are each provided with a plate or washer 10 and a nut 11. At the corresponding points in the web-portion 5 are formed a like number of slots 12 adapted to receive the said studs 9. Upon the inner periphery of the web-portion 5, at a position adjacent to the plain side thereof, is formed a flange 13 or a series of projections against the inner edge of which one edge of each of the plates 10 is adapted to bear when such plates are clamped against the inner periphery of the web-portion 5 by means of the nuts 11, as clearly shown in Fig. 2.

As here shown, in Fig. 2, the rim when placed in position upon the felly 14 of the wheel is secured in place by means of clips or plates 15, which are clamped against the lateral sides of such rim by means of nuts 16 screwed upon bolts or studs 17 passing through such felly in accordance with the well-known practice in connection with the attachment of certain of the dismountable rims at present on the market. This method is, however, shown merely by way of example and any other suitable means may therefore be substituted for this purpose.

In cases where separate locking means are provided for securing the members of the rim together, suitable recesses as 18 will be formed in the felly to accommodate such means as here shown.

In operation, when it is desired to mount the tyre, the rim-members 1 and 4 are separated. For this purpose, the nuts 11 are slackened sufficiently to permit of the plates 10 passing over the flange 13, thus allowing the studs 9 to be withdrawn from the slots 12. The tyre 19 is then slipped into place upon the rim-member 1 by passing it over the plain side of the web-portion 2, after which the rim-member 4 is then replaced and such members secured together again.

It will be seen therefore that as the web-portion of the second rim-member is passed into place within the web-portion of the first rim-member, upon which the tyre is already mounted, such second rim-member will not, during such operation come in contact with the second member until the bead of the latter receives the bead of the tyre and consequently there will be no possibility of damaging the tyre or pinching the tube, however carelessly the operation may be performed. Again, in consequence of the fact that the lateral edge of the first member lies at a point adjacent to the bead of the second member, it will be understood that the base of the bead of the tyre will overlie the joint as clearly shown in Fig. 2, and thus effectively sealing the joint and so preventing the entrance of grit and other foreign matter.

I claim:—

1. A divisible tire-carrying rim, comprising an inner rim member and an outer rim member, each having a web portion and a bead around one of its lateral sides, the web portion of the inner rim member being adapted to fit telescopically within the web portion of the outer member, said inner member having in its web portion a plurality of open-ended transverse slots extending from that edge of the inner rim member that is nearer to the bead of the outer rim member, radially disposed threaded studs carried by the outer rim member in position to engage said slots, a plate adapted to receive the end of each of said studs after its passage through its slot, a nut for securing said plate in position, and means carried by the free edge of the inner rim member for preventing rotation of said plate on said stud.

2. A divisible tire-carrying rim, comprising an inner rim member and an outer rim member, each having a web portion and a bead around one of its lateral sides, the web portion of the inner rim member being adapted to fit telescopically within the web portion of the outer member, said inner member having in its web portion a plurality of open-ended transverse slots extending from that edge of the inner rim member that is nearer to the bead of the outer rim member, radially disposed threaded studs carried by the outer rim member in position to engage said slots, a plate adapted to receive the end of each of said studs after its passage through its slot, a nut for securing said plate in position, and an inwardly extending flange carried by the free edge of the inner rim member for preventing rotation of said plate on said stud.

In witness whereof I have hereunto set my hand in the presence of two witnesses.

WILLIAM WILSDEN McRAE.

Witnesses:
 CYRIL CARLYN CONLEE,
 SIDNEY JAMES TRELEAVER.